Figure 1:
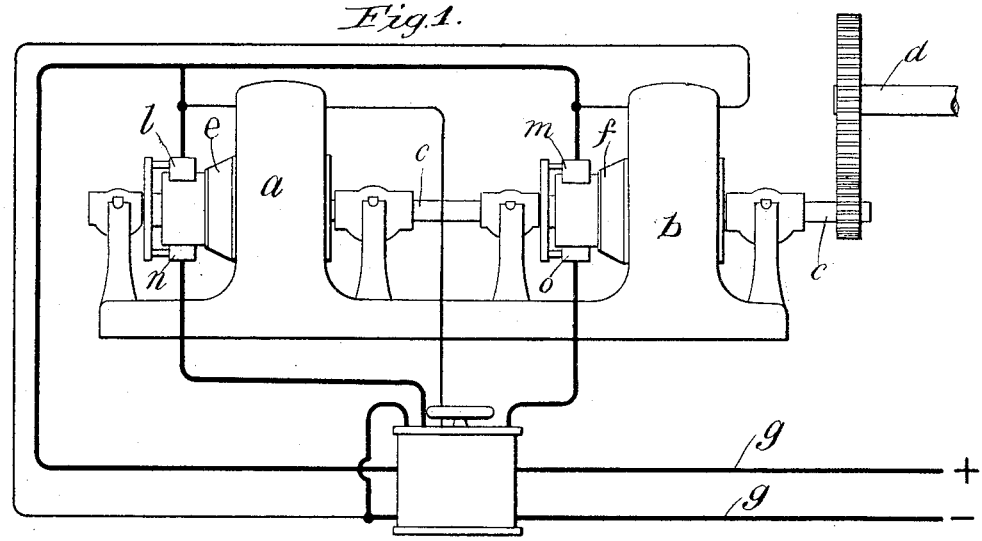

No. 747,236. PATENTED DEC. 15, 1903.
J. A. SCHAEFER.
POWER TRANSMISSION MECHANISM.
APPLICATION FILED JUNE 9, 1902.
NO MODEL.

Witnesses:
Lynn A. Williams
Harvey L. Hanson

Inventor:
Joseph A. Schaefer,
By Charles A. Brown Cragg
Attorneys.

No. 747,236. Patented December 15, 1903.

UNITED STATES PATENT OFFICE.

JOSEPH A. SCHAEFER, OF CHICAGO, ILLINOIS.

POWER-TRANSMISSION MECHANISM.

SPECIFICATION forming part of Letters Patent No. 747,236, dated December 15, 1903.

Application filed June 9, 1902. Serial No. 110,796. (No model.)

*To all whom it may concern:*

Be it known that I, JOSEPH A. SCHAEFER, a citizen of the United States, residing at Chicago, in the county of Cook and State of Illinois, have invented a certain new and useful Improvement in Power-Transmission Mechanism, (Case No. 1,) of which the following is a full, clear, concise, and exact description, reference being had to the accompanying drawings, forming a part of this specification.

My invention relates to power-transmission mechanism, and is designed particularly for use in connection with perfecting-presses, though it may have other application.

As is well known, it is essential to start large perfecting-presses very gradually, it being desired to eliminate all sudden shocks or jars, however small, in the driving of such presses which might cause the paper to be torn and throw the operating mechanism out of the nice adjustment which is required. The presses, particularly in making up, have to be frequently started, stopped, and moved slightly—as, for example, when stereotype-plates are fitted to the cylinders, where it is necessary to turn the press frequently to effect the required rotation of the rollers to expose different quadrants of the surface for the attachment of the plates. Hitherto such mechanism has occasionally worked improperly, entailing disadvantages, the avoidance of which has been sought.

It has been proposed to employ two motors, one of small capacity connected with the load through slow-motion gearing, this motor constituting an auxiliary motor and connected with the load through the agency of a clutch, this motor being provided for overcoming the inertia of the load to start the same. After the load has been started by the auxiliary motor acting in coöperation with the slow-motion gearing the second motor, constituting the main motor, is brought into operation to further increase the speed of the load toward the normal. As the speed of the load rises above the speed of the auxiliary motor, the latter is disengaged by the action of the clutch and may be brought to rest. It will be seen in such apparatus that the clutching mechanism in association with other parts introduces complications which have to be reckoned with.

I have designed power mechanism which at all times is able to fully accomplish the results desired in the operation of perfecting-presses. Generally speaking, this power mechanism comprises two motors of different normal speeds, one a low-speed motor and the other a high-speed motor, having permanent and preferably fixed mechanical union with each other and coupled with the load through a common instrumentality,—as, for example, a gear having fixed connection with both of the motors. The slow-speed motor is preferably of comparatively small power, while the high-speed motor is of considerably more power, being designed to operate the load at the load's normal speed. An effective permanent mechanical union between the two motors is preferably secured by means of a shaft common thereto, and the motors selected are preferably electric motors, the armatures whereof are fixedly mounted upon the common shaft. Direct-current motors are well adapted for the service. There is employed in association with each motor a controller, the controller for the slow-speed motor being first operated to bring it to its maximum speed, the controller for the high-speed motor being operated in time to effect torque upon the common shaft, so that the shaft will continue to have torque exerted thereupon as the controller of the first motor is operated to throw it out of action. By means of the two motors a torque that increases very gradually from minimum to maximum is placed upon the shaft, the initial torque being exerted by the motor of low speed and small power, this motor of smaller capacity serving through the agency of its controller to gradually increase the speed and the torque exerted upon the power-shaft within the range of the minimum speed and torque of the motor of larger capacity, which motor of larger capacity gradually increases its minimum speed and torque upon the shaft (which approximates the maximum torque and speed of the motor of smaller capacity) until the required normal torque upon the shaft is attained and the desired high rate of speed of the shaft secured. The two motors thus act in the place of a single motor, securing advantages that could not be secured by a single motor and inasmuch as such motor would have to be capable of exerting maximum torque to create the highest rate of speed of the operating-shaft, such a motor inherently being incapable of exerting that torque to produce the required minimum speed that is requisite in starting such a load as that put upon the operating mechanism in the operation of perfecting printing-presses. Moreover, my improved construction is such that not only is the load thus gradually started brought to its normal speed, but where it is desired to gradually reduce the speed of the load to zero the motors may be operated in an inverse manner to that specified, producing no sudden shocks or jars upon the load as it is brought to rest. Preferably the motors are not simultaneously supplied with power except where the work of the one is taken up or continued by the other, the armature of the idle motor being thus an unobjectionable additional load.

I will explain my invention more fully by reference to the accompanying drawings, in which—

Figure 2:
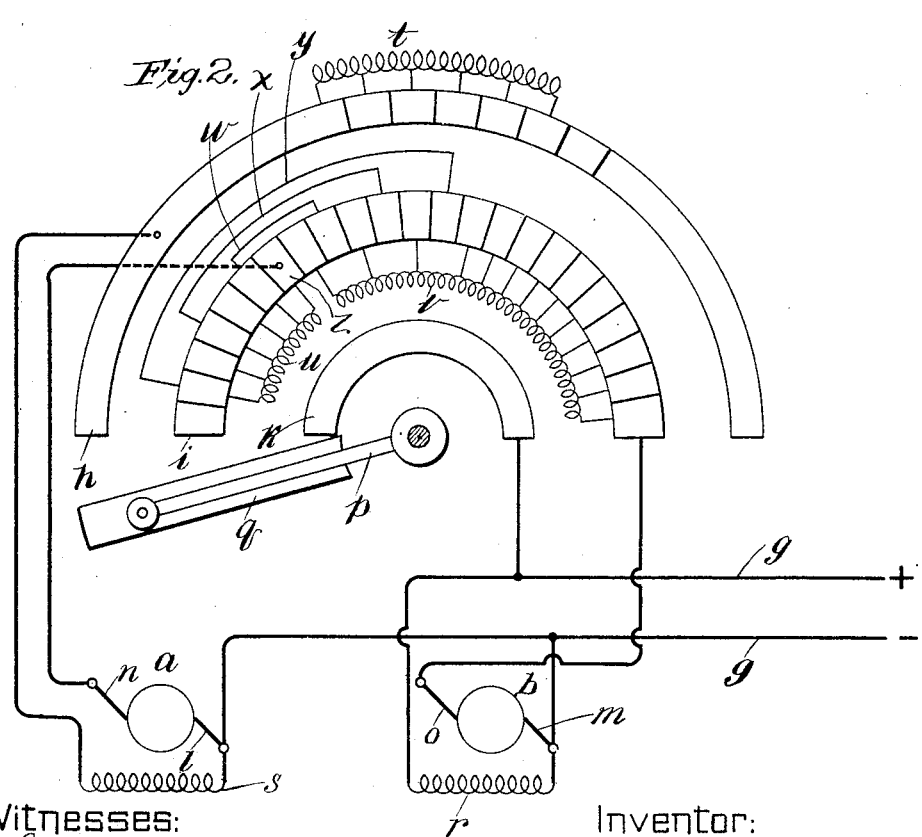

Figure 1 is a side elevation of apparatus constructed in accordance with the invention, circuit connections being diagrammatically indicated. Fig. 2 is a more diagrammatic illustration of certain characteristics of the system illustrated in Fig. 1.

Like parts are indicated by similar characters of reference in both views.

The motors $a$ $b$ may be mounted upon a common base and are arranged to exert torque upon the common fixed mechanical connection between the motors—as, for example, the working shaft $c$, that is in driving engagement with the operating-shaft $d$, that may operate the press or other load. The motor $a$ may, for example, be considered the slow-speed motor of comparatively small power, while the motor $b$ may be considered the high-speed motor of larger power. The motor $a$, for example, may be rated at five-horse power, while the motor $b$ may be rated at fifty-horse power, while the speeds of the motors $a$ and $b$ may be at maximum fifty and five hundred revolutions, respectively, while the motor $b$ may have its minimum rate of speed at fifty revolutions. The motor $a$ thus constitutes an auxiliary motor, serving to drive the shaft $c$ at a low rate of speed, which at times is desirable and which could not be effected by means of the motor $b$.

In operating a press the shaft $d$ is preferably run at a much lower rate of speed with reference to the shaft $c$, so that a limited movement of the slow-speed motor may be accompanied by a much reduced motion of the operating-shaft, whereby the press may be moved very slightly when desired. The particular form of motors shown are electric motors of direct-current type, the field-magnets whereof are stationary, while their armatures $e$ and $f$ are fixedly secured upon the common shaft $c$. The motors may be supplied with current from common supply-mains $g$ $g$. Each motor has a controller, these controllers being preferably merged in a unitary apparatus having a common regulating lever or handle and are desirably in the form of the rheostats illustrated.

The compound controller preferably has three segments of contacts $h$ $i$ $k$, the segmental contact $k$ being connected directly with one main $g$, which contact $k$ is common to the entire double controller. The companion main $g$ is directly connected with the brushes $l$ and $m$ of the motors, the other brushes $n$ and $o$ of the motors being connected with one of the contacts in the segment $i$, which is subdivided into sections after the manner of rheostat construction. The handle $p$ of the rheostat is provided with a brush or contact-blade $q$, that serves to connect the common terminal $k$ with a particular plate of the row $i$ in engagement therewith, whereby either or both of the armatures of the motors may be connected in bridge of the supply-mains, as desired. The field-winding $r$ of the motor $b$ is preferably permanently included in circuit with the mains $g$ $g$, while the field-winding $s$ of the motor $a$ is preferably excluded from circuit with the mains $g$ $g$ when the main motor $b$ is in full operation. To this end the set of contacts $h$ is interposed between the field-winding and its connection with one of the supply-mains, the brush $q$ serving by connecting the plates $h$ and $k$ to connect the field-winding in circuit. The active plates of the group $h$ are united by means of rheostat resistance $t$, whereby the field may be gradually excluded from circuit or included in circuit. The rheostat resistance $u$, associated with the set of contacts $i$, is peculiar to the motor $a$, while the rheostat resistance $v$ is peculiar to the motor $b$, these resistances being subdivided and connected with contacts in the group $i$ in the manner of rheostats. Some of the contacts $i$, connected with the rheostat resistances $u$ and $v$ are, however, preferably so interrelated that when the auxiliary motor is being relieved by the main motor or in reducing the speed when the main motor is to be replaced by the auxiliary motor such transition may be gradually accomplished, both motors for a time being active in producing torque upon the common shaft. To this end conductors $w$, $x$, and $y$ may unite contact-plates connected with the resistances $u$ and $v$.

Assuming that the load is at rest and that it is to be brought to speed, the handle $p$, as it appears in the drawings, may be moved in a clockwise direction, first completing the field-circuit $s$, next closing circuit through the armature of the motor $a$, through all of the resistance $u$, this resistance being gradually cut out of circuit until the brush reaches the plate $z$, with which the brush $n$ has direct electrical connection, whereupon all the resistance in circuit with the armature of the motor $a$ will be cut out of circuit. The handle $p$ in its progress from the plate $z$ includes the armature of motor $b$ in circuit with the mains $g$ $g$, the entire resistance $v$ being initially included. As the arm $p$ continues in its travel the resistance $v$ is gradually cut out of circuit, the conductors $w$, $x$, and $y$ being so connected as to gradually cut the resistance $u$ into the armature-circuit of motor $a$. Finally, after electrical connection of the brush $q$ with the wire $y$, as stated, the armature of motor $a$ is entirely cut out of circuit. The brush $q$ continuing further in its movement, the balance of the resistance $v$ is cut out of circuit, and the armature of the motor $b$ is completely included in circuit without any extraneous resistance. The resistance $t$ in addition to regulating the field will prevent sparking. Thus the auxiliary motor $a$ is gradually brought to speed and with it the load, the main motor $b$ being also gradually brought to speed, the lower speed of the main motor being achieved during the operation of the auxiliary motor at its higher limit of speed, the two motors thus dovetailing in their operation, producing a most gradually-increasing torque and speed of the shaft and corresponding very gradual increase in the speed of the load.

The advantages of such a power system as that set forth will be apparent to those skilled in the art both in its broad and specific aspects with or without the association of the peculiar controlling agency disclosed.

It will be obvious that many changes may be made in the apparatus set forth without departing from the spirit of the invention, and I do not wish to be limited to the precise construction shown. While I have shown a shaft rigidly coupling revolving elements of the motors, which motors thus have the same rate of speed, I do not wish to be limited to the means shown for securing the same ratios of speed of the motors, whether the motors revolve at the same or different rates of speed, as I consider it to be new with me to bring high and low speed motors in permanent mechanical engagement to secure a constant ratio of speed between the motors.

Having described my invention, I claim as new and desire to secure by Letters Patent—

1. In a power-transmission mechanism, the combination with two motors of high and low speed relatively, and of large and small power respectively of a permanent mechanical connection constantly uniting the motors, and a controller for the low-speed motor, substantially as described.

2. In a power-transmission mechanism, the combination with two motors of high and low speed relatively, and of large and small power respectively of a permanent mechanical connection constantly uniting the motors, and a controller for the high-speed motor, substantially as described.

3. In a power-transmission mechanism, the combination with two motors of high and low speed relatively, of a permanent mechanical connection constantly uniting the motors, and controlling mechanism for both motors, substantially as described.

4. In a power-transmission mechanism, the combination with two motors of high and low speed relatively, of a permanent mechanical connection constantly uniting the motors, and controlling mechanism for both motors, the controlling mechanism of the high-speed and the low-speed motor having a common controlling agency and being so interrelated that the high-speed motor is started before the low-speed motor is thrown out of service, substantially as described.

5. In a power-transmission mechanism, the combination with two electric motors of high and low speed relatively, and of large and small power respectively of a permanent mechanical connection constantly uniting the motors, substantially as described.

6. In a power-transmission mechanism, the combination with two electric motors of high and low speed relatively, and of large and small power respectively of a permanent mechanical connection constantly uniting the motors, and a controller for the low-speed motor, substantially as described.

7. In a power-transmission mechanism, the combination with two electric motors of high and low speed relatively, and of large and small power respectively of a permanent mechanical connection constantly uniting the motors, and a controller for the high-speed motor, substantially as described.

8. In a power-transmission mechanism, the combination with two electric motors of high and low speed relatively, of a permanent mechanical connection constantly uniting the motors, and controlling mechanism for both motors, substantially as described.

9. In a power-transmission mechanism, the combination with two electric motors of high and low speed relatively, of a permanent mechanical connection constantly uniting the motors, and controlling mechanism for both motors, the controlling mechanism of the high-speed and the low-speed motor having a common controlling agency and being so interrelated that the high-speed motor is started before the low-speed motor is thrown out of service, substantially as described.

10. In a power-transmission mechanism, the combination with two electric motors of high and low speed relatively, and of large and small power respectively of a shaft upon which the armatures of both motors are fixedly mounted, substantially as described.

11. In a power-transmission mechanism, the combination with two electric motors of high and low speed relatively, and of large and small power respectively of a shaft upon which the armatures of both motors are fixedly mounted, and a controller for the low-speed motor, substantially as described.

12. In a power-transmission mechanism, the combination with two electric motors of high and low speed relatively, and of large and small power respectively of a shaft upon which the armatures of both motors are fixedly mounted, and a controller for the high-speed motor, substantially as described.

13. In a power-transmission mechanism, the combination with two electric motors of high and low speed relatively, of a shaft upon which the armatures of both motors are fixedly mounted, and controlling mechanism for both motors, substantially as described.

14. In a power-transmission mechanism, the combination with two electric motors of high and low speed relatively, of a shaft upon which the armatures of both motors are fixedly mounted, and controlling mechanism for both motors, the controlling mechanism of the high-speed and the low-speed motor having a common controlling agency and being so interrelated that the high-speed motor is started before the low-speed motor is thrown out of service, substantially as described.

15. In a power-transmission mechanism, the combination with two motors of high and low speed relatively, and of large and small power respectively of means for constantly maintaining mutual driving connection between the motors, substantially as described.

16. In a power-transmission mechanism, the combination with two motors of high and low speed relatively, of a permanent mechanical connection constantly uniting the motors, and controlling mechanism for both motors, the controlling mechanism of the high-speed and the low-speed motor having a common controlling agency and being so interrelated that the high-speed motor is started before the low-speed motor is thrown out of service, and vice versa, substantially as described.

17. In a power-transmission mechanism, the combination with two electric motors of high and low speed relatively, of a permanent mechanical connection constantly uniting the motors, and controlling mechanism for both motors, the controlling mechanism of the high-speed and the low-speed motor having a common controlling agency and being so interrelated that the high-speed motor is started before the low-speed motor is thrown out of service, and vice versa, substantially as described.

18. In a power-transmission mechanism, the combination with two electric motors of high and low speed relatively, and of large and small power respectively of a shaft upon which the armatures of both motors are fixedly mounted, and controlling mechanism for both motors, the controlling mechanism of the high-speed and the low-speed motor having a common controlling agency and being so interrelated that the high-speed motor is started before the low-speed motor is thrown out of service and vice versa, substantially as described.

19. In a system of power transmission, the combination with high and low speed motors, of a common load-operating element actuated thereby, and means for constantly maintaining a constant ratio of speed between the motors, substantially as described.

In witness whereof I hereunto subscribe my name this 5th day of June, A. D. 1902.

JOSEPH A. SCHAEFER.

Witnesses:
HARVEY L. HANSON,
JOHN STAHR.